(12) United States Patent
Janssens et al.

(10) Patent No.: US 9,871,744 B2
(45) Date of Patent: Jan. 16, 2018

(54) METHOD AND APPARATUS FOR DYNAMICALLY ASSIGNING RESOURCES OF A DISTRIBUTED SERVER INFRASTRUCTURE

(71) Applicant: ALCATEL LUCENT, Paris (FR)

(72) Inventors: Nico Janssens, Putte (BE); Xueli An, Antwerp (BE)

(73) Assignee: Alcatel Lucent, Boulogne-Billancourt (FR)

( * ) Notice: Subject to any disclaimer, the term of this patent is extended or adjusted under 35 U.S.C. 154(b) by 393 days.

(21) Appl. No.: 14/350,609

(22) PCT Filed: Oct. 2, 2012

(86) PCT No.: PCT/EP2012/069453
§ 371 (c)(1),
(2) Date: Apr. 9, 2014

(87) PCT Pub. No.: WO2013/053619
PCT Pub. Date: Apr. 18, 2013

(65) Prior Publication Data
US 2014/0258546 A1 Sep. 11, 2014

(30) Foreign Application Priority Data
Oct. 14, 2011 (EP) .................................... 11306337

(51) Int. Cl.
*G06F 9/50* (2006.01)
*H04L 12/923* (2013.01)
(Continued)

(52) U.S. Cl.
CPC ........ *H04L 47/762* (2013.01); *G06F 9/45558* (2013.01); *G06F 9/505* (2013.01);
(Continued)

(58) Field of Classification Search
CPC ............... G06F 9/5011; G06F 11/0709; G06F 11/3433; G06F 11/505; G06F 11/5083;
(Continued)

(56) References Cited

U.S. PATENT DOCUMENTS

2005/0102676 A1* 5/2005 Forrester ................. G06F 9/505
718/105
2005/0120354 A1* 6/2005 Sunada ............... G06F 11/3495
719/310
(Continued)

OTHER PUBLICATIONS

Victor Koreev, "The Development of System Software for Parallel Supercomputers," Advances in Computer Systems Architecture, vol. 2823, pp. 47-53, XP002672083, 2003.
(Continued)

*Primary Examiner* — Barbara B Anyan
(74) *Attorney, Agent, or Firm* — Fay Sharpe, LLP

(57) ABSTRACT

A method for dynamically assigning resources of a distributed server infrastructure, the method comprising the steps of comparing an observed relative load of an assigned portion of said distributed server infrastructure with a desired relative load; if said observed relative load exceeds said desired relative load assigning additional resources, and redistributing tasks from said assigned portion to said additional resources; and if said desired relative load exceeds said desired relative load: selecting removable resources, redistributing tasks from said removable resources to other resources in said assigned portion, and removing said removable resources from said assigned portion; wherein said redistributing of tasks is performed in such a way that state information related to said tasks is preserved.

10 Claims, 6 Drawing Sheets

(51) Int. Cl.
*G06F 9/455* (2006.01)
*H04L 12/803* (2013.01)
H04L 29/08 (2006.01)
G06F 11/34 (2006.01)

(52) U.S. Cl.
CPC .......... *G06F 9/5088* (2013.01); *H04L 47/125* (2013.01); *G06F 11/3495* (2013.01); *H04L 67/1008* (2013.01)

(58) Field of Classification Search
CPC ......... G06F 11/5088; G06F 2209/5022; G06F 2209/508; H04N 21/23116; H04N 21/23103; H04N 21/2405; H04W 28/08; H04L 67/1002; H04L 67/1008; H04L 67/1036; H04L 67/1031; H04L 67/101; H04L 67/1012; H04L 67/148; H04L 67/1029; H04L 41/0896; H04L 47/125
See application file for complete search history.

(56) References Cited

U.S. PATENT DOCUMENTS

| | | | |
|---|---|---|---|
| 2007/0237162 A1* | 10/2007 | Hamanaka | G06F 11/1662 370/401 |
| 2008/0250260 A1 | 10/2008 | Tomita | |
| 2008/0320121 A1* | 12/2008 | Altaf | H04L 67/322 709/224 |
| 2010/0169477 A1* | 7/2010 | Stienhans | G06F 9/5083 709/224 |
| 2011/0078303 A1 | 3/2011 | Li et al. | |
| 2011/0167421 A1 | 7/2011 | Soundararajan et al. | |
| 2012/0066371 A1* | 3/2012 | Patel | H04L 67/1031 709/224 |
| 2012/0096461 A1* | 4/2012 | Goswami | G06F 9/45558 718/1 |
| 2012/0226797 A1* | 9/2012 | Ghosh | H04L 51/043 709/224 |
| 2013/0080517 A1* | 3/2013 | T'Syen | H04L 45/00 709/203 |
| 2013/0111467 A1* | 5/2013 | Sundararaj | G06F 9/505 717/176 |
| 2013/0174177 A1* | 7/2013 | Newton | H04L 67/1008 718/105 |
| 2013/0198743 A1* | 8/2013 | Kruglick | G06F 9/45533 718/1 |

OTHER PUBLICATIONS

Trieu C. Chieu et al., Dynamic Scaling of Web Applications in a Virtualized Cloud Computing Environment, IEEE International Conference on E-Business Engineering, pp. 281-286, XP031571902, 2009.

Zhenhuan Gong et al., "PRESS: Predictive Elastic ReSource Scaling for cloud systems," International Conference on Network and Service Management (CNSM), pp. 9-16, XP031852193, 2010.

International Search Report for PCT/EP2012/069453 dated Mar. 4, 2013.

* cited by examiner

METHOD AND APPARATUS FOR DYNAMICALLY ASSIGNING RESOURCES OF A DISTRIBUTED SERVER INFRASTRUCTURE

FIELD OF INVENTION

The present invention pertains to distributed computing systems, including distributed telecommunication systems, and more in particular to dynamic scaling of distributed computing infrastructures or "clouds".

BACKGROUND

Cloud computing has gained substantial momentum over the past few years, fueling technological innovation and creating considerable business impact. Public, private or hybrid cloud infrastructure shortens users' time to market (new hosting infrastructure is only a few mouse-clicks away), and claims to reduce their total cost of ownership by shifting the cost structure from higher capital expenditure to lower operating expenditure.

One of the key advantages of cloud computing is the ability to build dynamically scaling systems. Virtualization technologies (including XEN, KVM, VMware, Solaris and Linux Containers) facilitate clustered computing services to acquire and release resources automatically. This enables dynamically right-sizing the amount of resources that are actually needed, instead of statically over-dimensioning the capacity of such clustered services. Some key advantages emerging from dynamic right-sizing include (1) the ability to reduce the services' operational cost and (2) the ability to gracefully handle unanticipated load surges without introducing opportunity loss by compromising the service's SLA.

Although most existing dynamic scaling solutions have been targeting web and enterprise applications, also clustered and "cloudified" telecommunication services (such as SIP farms hosted by public or private clouds) can significantly benefit from the advantages of dynamic scaling. To guarantee carrier grade service execution, for instance, telecommunication operators typically over-dimension the employed resources—at the expense of reducing their resource utilization ratio, and thus raising their operational cost. This cost increases even more when the operator needs to provision sufficient resources to handle sporadic unanticipated load surges (caused by events with a significant social impact) or anticipated load spikes (e.g. caused by New Year's Eve texting).

SUMMARY

Accordingly, it is an object of embodiments of the present invention to provide methods and apparatus for proactive scaling of elastic (telecommunication) systems that more efficiently balance the tradeoff between reducing infrastructure cost, and providing enough overcapacity to deal with sudden increases in load.

According to an aspect of the present invention, there is provided a method for dynamically assigning resources of a distributed server infrastructure, the method comprising the steps of: comparing an observed relative load of an assigned portion of the distributed server infrastructure with a desired relative load; if the observed relative load exceeds the desired relative load: assigning additional resources, and redistributing tasks from the assigned portion to the additional resources; and if the desired relative load exceeds the desired relative load: selecting removable resources, redistributing tasks from the removable resources to other resources in the assigned portion, and removing the removable resources from the assigned portion; wherein the redistributing of tasks is performed in such a way that state information related to the tasks is preserved.

It is an advantage of the method according to the present invention that dynamic resource allocation can take place in computing environments in which preservation of session state information is of importance.

"Load" or "relative load", as used herein, can represent various metrics related to the degree to which the assigned resources are occupied, and more specifically the total work volume of the tasks being carried out by the resources. These metrics may include CPU usage, memory usage, response time, etc.

The target (i.e., the desired relative load) is not necessarily a single value, but may instead be specified as a range, having a lower threshold (low water mark) and a higher threshold (high water mark). In this way, hysteresis can be implemented, which reduces the risk of instability in dynamic systems.

In an embodiment of the method according to the present invention, the steps are applied iteratively.

It is an advantage of this embodiment, that the amount of allocated resources can be optimized on an ongoing basis.

In an embodiment of the method according to the present invention, the frequency of the iterative application of the steps is varied in function of a difference between the observed relative load and the desired relative load.

It is an advantage of this embodiment, that the allocation or removal of resources can happen faster in periods of rapidly growing or declining demand for resources.

In an embodiment of the method according to the present invention, the distributed server infrastructure is used to deploy an elastic telecommunication system.

In an embodiment of the method according to the present invention, the selecting removable resources comprises determining an individual load of resources among the assigned portion and selecting resources for which the individual load is lowest.

In an embodiment, the method according to the present invention further comprises assigning further additional resources in accordance with a time schedule, the time schedule representing recurring usage patterns for the distributed server infrastructure.

It is an advantage of this embodiment, that the resource allocation is performed in a proactive manner, to avoid opportunity loss due to SLA violations in times of rapid increase in demand for resources.

In a particular embodiment, the observed relative load is used to update the schedule.

According to an aspect of the present invention, there is provided a computer program configured to cause a processor to carry out the method as described above.

According to an aspect of the present invention, there is provided a system for dynamically assigning resources of a distributed server infrastructure, the system comprising: a monitoring agent configured to observe a relative load of an assigned portion of the distributed server infrastructure; a processor, operatively connected to the monitoring agent, the processor being configured to compare the observed relative load with a desired relative load; and a management agent, configured to transmit instructions to the distributed server infrastructure, and to act according to the following rules in response to the comparing: if the observed relative load exceeds the desired relative load: instruct the server infrastructure to assign additional resources, and redistribute tasks from the assigned portion to the additional resources; and if the desired relative load exceeds the observed relative load: select removable resources, redistribute tasks from the removable resources to other resources in the assigned portion, and instruct the server infrastructure to remove the removable resources from the assigned portion.

The advantages of the system according to the present invention are analogous to those described above with respect to the method according to the present invention. Features of specific embodiments of the method according to the present invention may be applied to the system according to the present invention with similar benefits and advantages.

In an embodiment, the system according to the present invention further comprises a scheduler operatively connected to said management agent, and said management agent is further configured to act according to the following rules in response to a signal from said scheduler: if said signal is indicative of an expected increase in demand for resources: instruct said server infrastructure to assign additional resources, and redistribute tasks from said assigned portion to said additional resources; and if said signal is indicative of an expected decrease in demand for resources: select removable resources, redistribute tasks from said removable resources to other resources in said assigned portion, and instruct said server infrastructure to remove said removable resources from said assigned portion.

In an embodiment of the system according to the present invention, the distributed server infrastructure comprises a plurality of SIP servers.

BRIEF DESCRIPTION OF THE FIGURES

Some embodiments of apparatus and/or methods in accordance with embodiments of the present invention are now described, by way of example only, and with reference to the accompanying drawings, in which.

Throughout the figures, like reference signs have been used to designate like elements.

DESCRIPTION OF EMBODIMENTS

Figure 1:
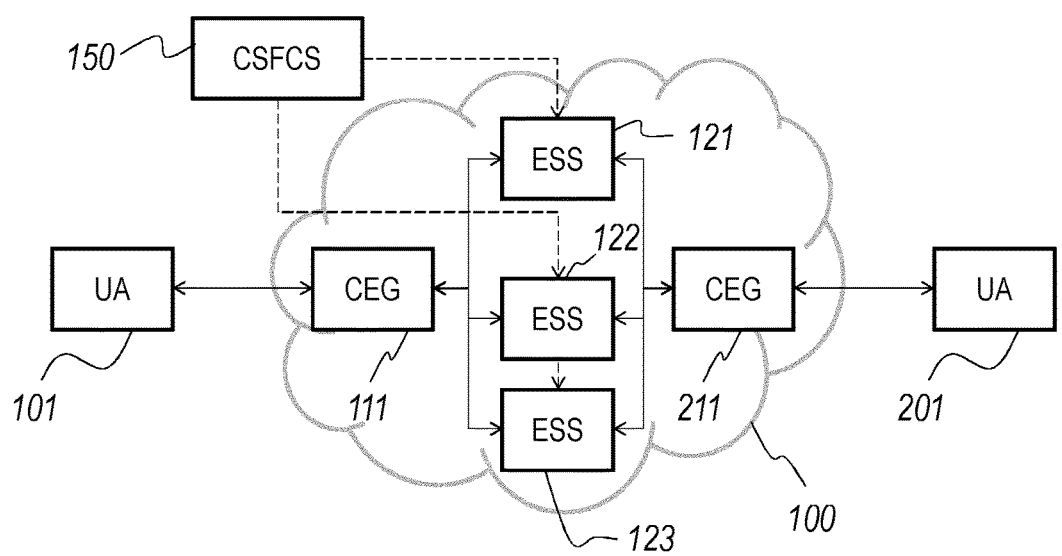
FIG. 1 schematically illustrates a network in which embodiments of the present invention may be deployed.

FIG. 1 schematically illustrates an exemplary network in which embodiments of the present invention may be deployed.

Although the invention is hereinafter primarily described in terms of embodiments relating to telecommunication systems, in particular virtual SIP servers implemented in a "cloud" infrastructure, the skilled person will appreciate that the invention is not limited thereto. The invention may be applied to various kind of distributed computing infrastructures, in particular where the concerned computing tasks are stateful.

Figure 5:
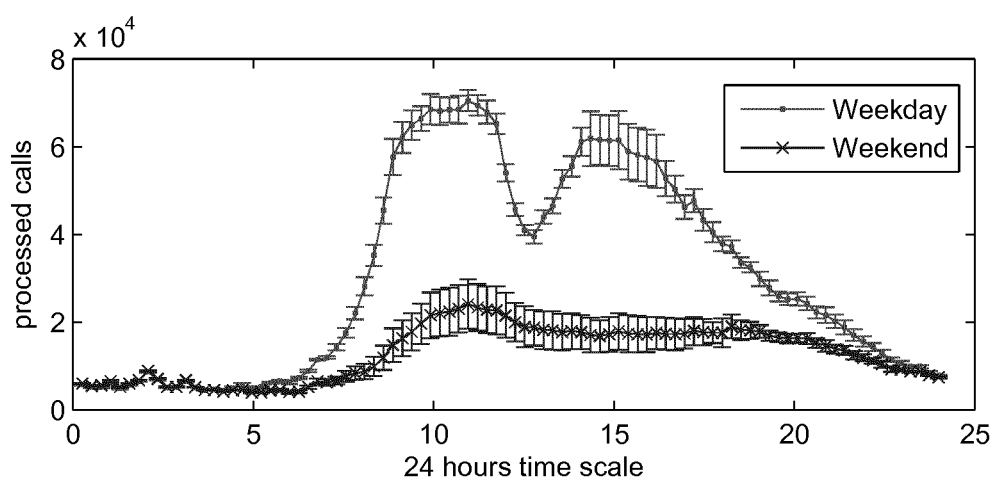
FIG. 5 illustrates the distribution of the number of processed calls per 15 minutes as measured during a month, with separate graphs for weekdays and week-ends.

Based on daily observations, it can be deduced that short-term load variations of a communication system largely adhere to recurring patterns (based on end users' daily routines). To illustrate this, FIG. 5 depicts the average number of processed calls per 15 minutes, collected by the inventors from a local trunk group in June 2011. From this data, it can be deduced that static peak load dimensioning results into an average capacity usage of only 50% (averaged out over 24 hours).

In addition to short-term load variations, telecommunication services are also exposed to long-term load variations. Small and medium size carriers, for instance, typically want to gradually increase the number of end users they support—starting for example with a pilot project that involves around ten thousand users, and gradually providing more infrastructure if the service becomes more successful. These examples illustrate that dynamically scaling clustered telecommunication services (depending on their current load) is a promising technique to (1) reduce their operational cost and (2) gracefully handle anticipated as well as unanticipated load surges.

According to the insight of the inventors, the value (and successful adoption) of dynamic scaling support for telecommunication services depends on (1) its ability to maximize resource utility (thus reducing the operational cost), (2) its ability to preserve the services' stringent carrier grade requirements (thus minimizing SLA violation penalties and the cost of losing customers), and (3) the ability to minimize the operating cost (overhead) of the scaling support.

Furthermore, according to the insight of the inventors, successful adoption of dynamic scaling in telecommunication requires an ability to cope with the predominantly stateful nature of these telecommunication services. While stateless web applications or RESTful webservices can scale in or out by nature without breaking ongoing interactions, this is typically not the case for (call) stateful telecommunication services such as B2BUAs or SIP proxies controlling middle boxes that implement firewall and NAT functions. Before removing a (cloud) instance that belongs to a stateful telecommunication service, one needs to ensure this instance is driven to a safe execution state. Such a state is reached once all sessions currently being processed by the affected instance have been terminated (which may significantly delay the removal of the affected cloud instance), or by transparently migrating these sessions towards other service instances.

To meet these requirements, embodiments of the present invention pertain to a Cloud Scaling Feedback Control System (CSFCS) 150 that implements dynamic scaling behavior for "cloudified" stateful telecommunication clusters—to maximize their utility (thus reducing the operational cost) while at the same time maintaining one or more key operating parameters (such as maximum response time). An embodiment of the CSFCS 150 is illustrated in more detail in FIG. 6.

FIG. 1 illustrates an exemplary SIP-based telecommunication network comprising two exemplary user agents 101, 201 interconnected by a single SIP domain 100. The SIP domain 100 comprises a first Client Elasticity Gateway (CEG) 111 and a second CEG 211, shielding a server cluster. Without loss of generality, the cluster is illustrated as containing three elastic SIP servers 121-123. The number of allocated SIP servers may increase or decrease as a result of the application of the method according to the present invention.

Without loss of generality, we consider the interaction between the first SIP CEG 111 and the topologically adjacent UA 101. SIP CEG 111 plays the role of User Agent Server (UAS) in all its communication with the UA 101, and the role of User Agent Client (UAC) in its relation with the SIP servers 121-123 of the elastic SIP cluster. The SIP CEG 111 thus conceals the elastic SIP servers 121-123 from the client 101 by acting as a single SIP server. It may include load balancing support and/or failover support by interacting with an Elasticity Control System (ECS) as described in European patent application no. 11 290 326.5 entitled "Method for transferring state information pertaining to a plurality of SIP conversations" in the name of the present Applicant. Further in accordance with the cited application, the SIP CEG 111 terminates elasticity control messages originating from the elastic SIP cluster 121-123, so it conceals the dynamics of the elastic SIP cluster from the UA 101—including instructions to redirect messages to another SIP server.

The CSFCS 150 according to the present invention may act in addition to or in replacement of the ECS of the cited application; the CSFCS 150 according to the present invention may in fact coincide with the ECS.

Today's cloud scaling support (such as offered by Amazon Web Service™, Google App Engine™ and Heroku™) provides the required ingredients to build application specific feedback control systems that automatically increase and decrease the amount of allocated cloud instances—being virtual machines, containers or service instances. Cloud load balancers distribute incoming traffic across these cloud instances, concealing their existence from client applications. Cloud monitoring components observe these cloud instances and report on metrics such as CPU utilization, response-time, drop-rate, queue lengths and request counts. Additionally, APIs are offered to create and release service instances, and to automatically initiate these operations when collected metrics exceed specified thresholds. Although these building blocks enable the development of web and enterprise applications that automatically scales out and back, they do not offer a unified solution tailored towards stateful telecommunication services (such as SIP clusters) that need to meet stringent carrier grade requirements listed above.

Figure 2:
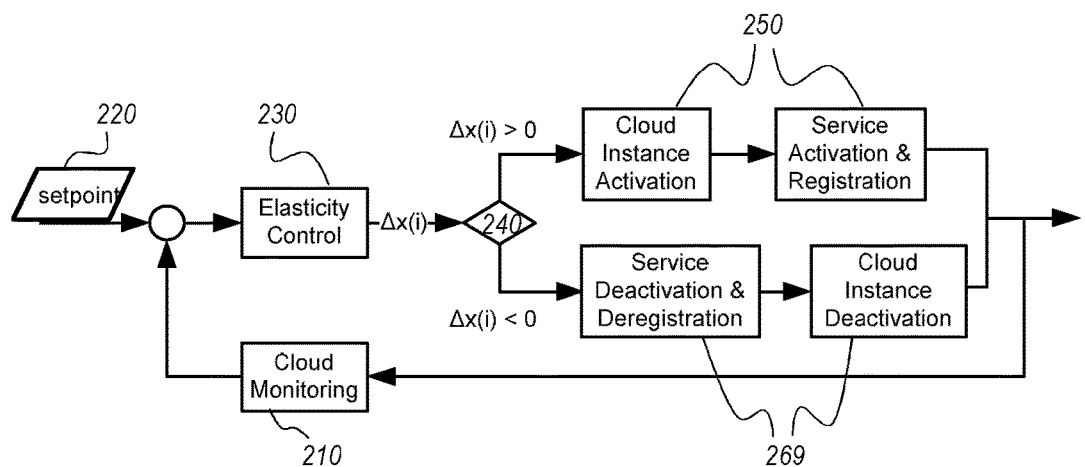
FIG. 2 illustrates a control loop process.

For the sake clarifying the invention, a feedback process is depicted in FIG. 2. Based on a specified set point 220 (defining the key operating parameters, such as average instance load or maximum response time) on the one hand, and monitoring data 210 reporting on operational metrics of the load balancer and/or the affected (cloud) instances on the other hand, the "elasticity control" 230 calculates how many (cloud) instances are currently needed (denoted as $\Delta x(i)$ in FIG. 2). If a global measurement exceeds 240 (upper branch) a specified high threshold (high-water mark), the feedback systems instruct the (cloud) infrastructure to acquire new resources and to launch new service instances 250. Similarly, if the global measurement drops below 240 (lower branch) the low threshold (low-water mark), the feedback control system instructs the (cloud) infrastructure to release spare resources 269.

The reactive nature of these feedback systems (they react when an operating parameter is currently exceeding a specified threshold) typically assumes that extra resources 250 can be provisioned immediately. However, booting new cloud instances (such as virtual machines) and initiating the services these cloud instances are hosting takes introduces an extra delay (up to a few minutes). Without anticipating this delay, SLA requirements might be violated during the actual provisioning of new resources, which in turn breaks the stringent carrier grade requirements of telecommunication services.

It is thus advantageous to be able to predict short-term load surges. Based on these predictions, the elasticity control determines how much resources will be needed in the near future, and pro-actively provisions the required resources to handle these load forecasts.

According to the insight of the inventors, it is advantageous to also take into account the potentially stateful nature of the distributed infrastructure, in particular in the case of telecommunication systems. Two contributions of the feedback system according to the present invention are now described, and may be deployed jointly or independently.

Firstly, successful adoption of dynamic scaling support for telecommunication services highly depends on its ability to preserve the services' stringent carrier grade requirements and to minimize opportunity loss due to SLA violations. Instead of responding to load changes in a reactive manner (for instance when a high-water mark is exceeded), the present solution exploits the potential value of pro-active resource provisioning based on short-term load forecasting. Hence, embodiments of the present invention are based on the observation that daily call load variations usually adhere to recurring patterns (illustrated in FIG. 5). This allows deducing load predictions (and the associated decisions to increase or decrease the amount of virtual servers) from a history of load observations. In case of unanticipated load surges that significantly diverge from these recurring patterns, we fallback to limited look-ahead predictions taking into account only on a few prior observations. Simulations and experiments indicate that this pro-active resource provisioning significantly reduces the amount of SLA violations.

Secondly, embodiments of the process according to the invention provide extra steps compared to the process depicted in FIG. 2. These extra steps handle session state. As explained above, a cloud instance can only be released safely once it is not accommodating any session (or other execution) state anymore. Since waiting for all ongoing sessions to terminate may significantly delay the removal of the affected cloud instance (hence compromising the ability to maximize resource utility and reducing operational cost), our cloud scaling system coordinates the migration of these sessions towards other instances.

Figure 3:
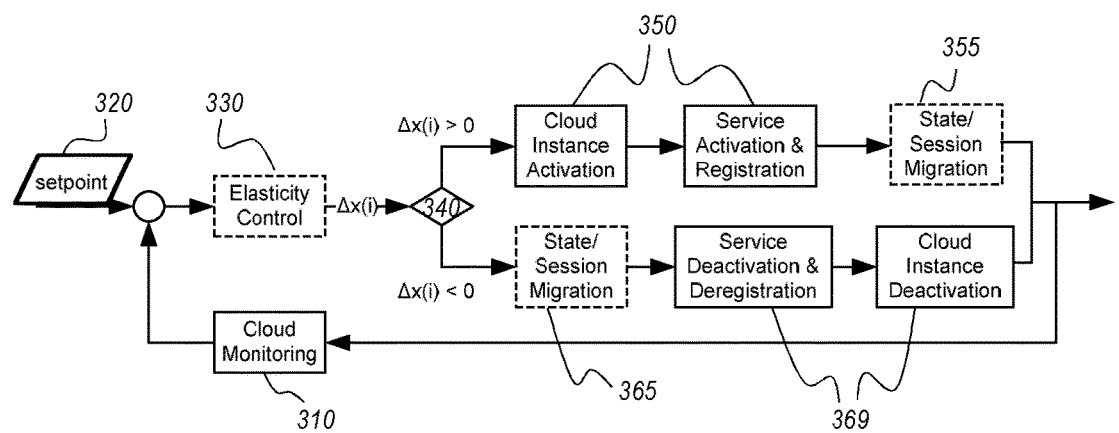
FIG. 3 illustrates a control loop process according to an embodiment of the present invention.

An exemplary feedback flowchart, as might result from the application of the above improvements, is depicted in FIG. 3. Based on a specified set point 320 (defining the key operating parameters, such as average instance load or maximum response time) on the one hand, and monitoring data 310 reporting on operational metrics of the load balancer and/or the affected (cloud) instances on the other hand, the "elasticity control" 330 calculates how many (cloud) instances are currently needed (denoted as $\Delta x(i)$ in FIG. 2). If a global measurement exceeds 340 (upper branch) a specified high threshold (high-water mark), the feedback system instructs the (cloud) infrastructure to acquire new resources and to launch new service instances 350. Subsequently, tasks or sessions are started on these newly launched instances. In addition to the assignment of fresh sessions to the newly launched instances, the load on the cloud infrastructure may be balanced by migrating 355 existing sessions from already running instances to the newly launched instances. Upon migrating these sessions, care must be taken to maintain session integrity and to correctly transfer state information. Similarly, if the global measurement drops below 340 (lower branch) the low threshold (low-water mark), the feedback control system instructs the (cloud) infrastructure to release spare resources 369. Prior to this release, any sessions that are still running on the resources marked for release are preferably migrated 355, along with the associated state association, to remaining instances.

Where the distributed services concern SIP services, the addition and removal of instances may occur as follows:

If an increase in the number of cloud instances is required, the CSFCS first invokes the cloud infrastructure to activate these new cloud instances (containing the telco service instances—such as SIP servers). Next, the CSFCS activates these new telco service instances and registers them to the load balancer(s)—from this point on they can accept new requests. Finally, the CSFCS rebalances ongoing sessions (if needed) to let the new telco service instances take on part of the load of their peers.

If a decrease in the number of cloud instances is required, the CSFCS first prepares the safe removal of the affected telco service instances. This involves first waiting until all ongoing transactions are finished, and subsequently migrating ongoing sessions to the remaining servers. The CSFCS deactivates and deregisters the affected telco service instances—hence preventing them from accepting and processing new sessions. Finally, the CSFCS can safely instruct the cloud infrastructure to deactivate the cloud instances accommodating these quiescent service instances.

Further details about the methods by which sessions may be migrated without loss of session information can be found in European patent applications EP 11 290 327.3 and EP 11 290 326.5, in the name of the Applicant. Embodiments of the present invention comprise session migration steps according to the methods described in those documents, which shall expressly be considered to be incorporated by this reference.

Although the comparison between the observed load and the desired load is schematically represented in the Figures as a single comparison, this is done for clarity purposes only. It is possible to use a single threshold value to trigger both addition and removal of resources. However, it is advantageous to choose a low threshold and a high threshold which are not the same. The use of non-identical low and high thresholds implies that the "desired load" is in fact a range, and the method as described will act to keep or return the system in/to the desired operated range.

Figure 4:
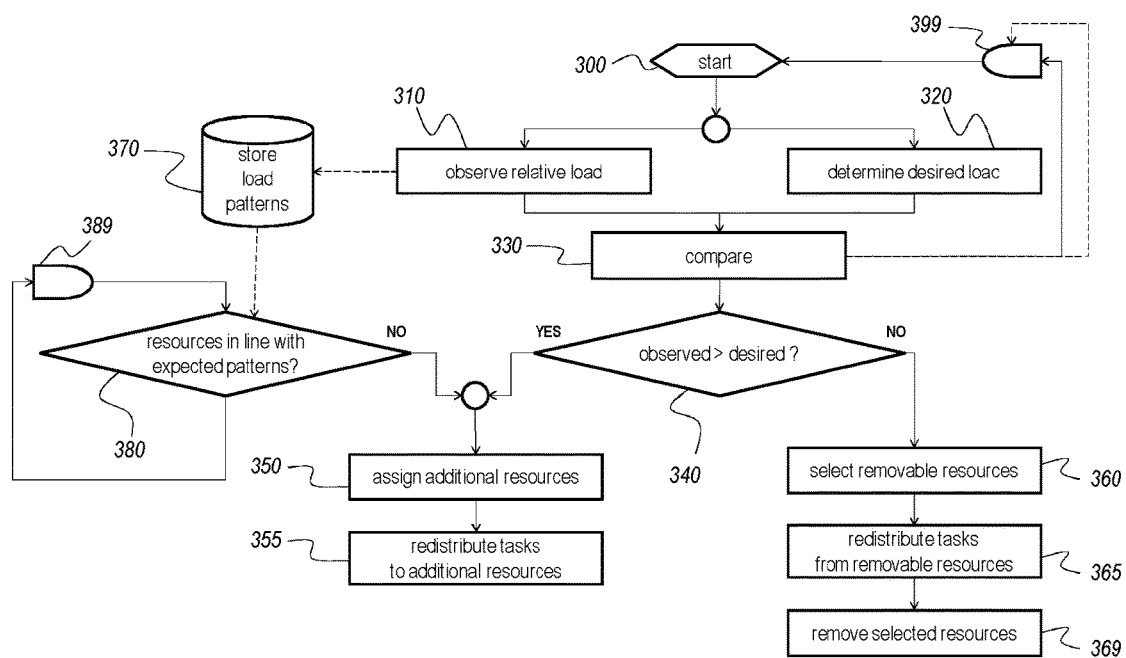
FIG. 4 illustrates a control loop process according to another embodiment of the present invention.

A more elaborate embodiment of the process according to the invention is illustrated in FIG. 4.

The illustrated method formally starts at the starting point labeled 300, and returns to this point periodically with a frequency determined by the variable delay 399. The delay element 399 is only a logical delay, representing any technical means suitable to implement the desired periodicity).

The instantaneous load of the network 100 is determined 310 and compared 330 to a desired load or set point 320. The desired load may be a value or a range stored in a memory, retrieved via a management interface, etc. The result of the comparison 330 is used to assess 340 whether it is necessary to increase or decrease the amount of assigned resources; the details of the two branches of the selection 340 have already been described above in connection with FIG. 3. The above mentioned steps are periodically repeated with a symbolic delay 399; as illustrated by the dashed line, this delay 399 may be reconfigured in function of the measured load, and more in particular in function of the rate at which the measured load changes.

The most current load observations 310 and/or any other available load data may be stored in an appropriate storage means 370, such as an internal memory, a disk drive, etc. Another periodical process 380-390 provides an ongoing assessment of whether the allocated resources are in line with the usage that may be expected given the known time-recurring patterns (in particular, the expected usage in function of the time of day and the day of the week). Again, the delay element 389 is only a logical delay, representing any technical means suitable to implement the desired periodicity.

Various limited look-ahead load predictions have been evaluated, including linear extrapolation, spline extrapolation and adaptive Kalman predictions. Simulations have indicated that linear extrapolation presents very good results in terms of minimizing the occurrence of over-estimation (i.e., situations in which a higher load had been predicted than actually measured), while Kalman predictions present very good results in terms of minimizing the occurrence of under-estimation (i.e., avoiding situations in which a lower load had been predicted than actually measured).

The CSFCS may be configured to apply the most suitable look-ahead technique, depending on the actual cost of over and under-estimation.

To further reduce the occurrence of over and under-estimation, CSFCS can also be configured to dynamically adapt the sampling rate if needed. In an embodiment, the CSFCS halves the sampling interval when the prediction exceeds a specified threshold. When the error drops below a lower error, in contrast, the sampling interval is gradually increased. Simulations have indicated that this techniques results in more accurate load predictions, but at a higher monitoring cost (more frequent sampling).

Beside supporting the above mentioned limited look-ahead predictions, the CSFCS may also exploit recurring load variation patterns. In an embodiment, every monitoring result is added to a time-series representing a specific timestamp k for a specific class of days (weekdays, holidays, weekends, etc.). Kalman filters, linear extrapolation, and spline extrapolation are then used to predict the future load on timestamp k (e.g. tomorrow), taking into account the history of previous measurements that occurred at the same timestamp k. In case of unanticipated load surges that significantly diverge from these recurring patterns, the CSFCS may fall back on limited look-ahead predictions taking into account only on a few prior observations.

Hence, embodiments of the cloud scaling feedback control system according to the present invention optimizes the resource utilization ratio of a telco cloud, by (1) exploiting recurring load variation patterns (inherent to telecommunication services) to pro-actively scale out and back (cloudified) telecommunication clusters, (2) falling back to limited-lookahead predictions (taking into account only a few prior measurements) in case of unanticipated load surges that significantly diverge from these recurring load variation patterns, and (3) minimizing the impact of session state on resource utility by coordinating the migration of session state (instead of waiting until all ongoing sessions have been terminated).

All this enables the maximization of the resource utility in a telecommunication cloud (thus reducing the operational cost) while at the same time maintaining one or more key operating parameters (such as maximum response time).

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

Figure 6:
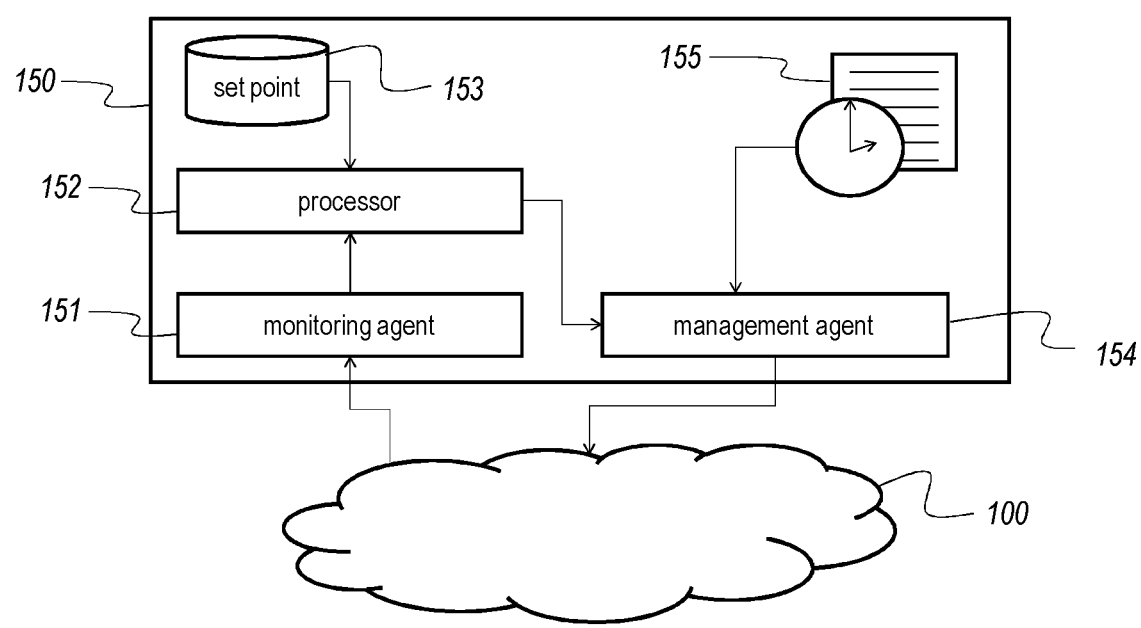
FIG. 6 schematically illustrates an embodiment of the system according to the present invention.

FIG. 6 schematically illustrates a system, i.e. a CSFCS 150, according to an embodiment of the present invention. The CSFCS 150 interacts with a network 100 comprising distributed server resources, such as the SIP network 100 illustrated in FIG. 1. For this purpose, the CSFCS 150 is understood to have the necessary interfaces (hardware and software), as are known to the person skilled in the art of communication networking. On the one hand, a monitoring agent 151 retrieves information about the current load state of the infrastructure from the network 100, and on the other hand a management agent 154 is configured to send instructions to the server infrastructure. Input from the monitoring agent 151 is compared to a set point 153 by a processor 152, to determine whether the presently allocated infrastructure is under- or overloaded. Depending on this comparison, and acting in a fully analogous way as described for the methods according to the present invention, the processor 152 will cause the management agent 154 to instruct the infrastructure to allocate more or less resources, as required, while ensuring state preservation by carrying out the necessary session migrations in a state-respecting manner. Optionally, a scheduler 155 uses stored knowledge about recurring usage patterns to cause the management agent 154 to proactively instruct the infrastructure to allocate more or less resources, as required according to the usage expected in the (near) future. The skilled person will appreciate that one or more of the monitoring agent 151, processor 152, set point 153, management agent 154, and scheduler 155 may be implemented in a common hardware component. The CSFCS 150, and most particularly the processor 152 and the management agent 154, may further be configured to carry out other functions related to the various embodiments of the method according to the invention as described above.

The functions of the various elements shown in the figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

The invention claimed is:

1. A method for dynamically assigning resources of a distributed server infrastructure, said distributed server infrastructure comprising a plurality of SIP servers configured to deploy an elastic telecommunications system, the method comprising:
    comparing an observed relative load of an assigned portion of said distributed server infrastructure with a desired relative load;
    if said observed relative load exceeds said desired relative load:
        transmitting instructions to said distributed server infrastructure to assign additional resources, and
        redistribute sessions from said assigned portion to said additional resources, said redistributing comprising waiting until ongoing transactions related to said sessions are finished and migrating said sessions to said additional resources; and
    if said desired relative load exceeds said observed relative load:
        transmitting instructions to said distributed server infrastructure to select removable resources,
        redistribute sessions from said removable resources to other resources in said assigned portion, said redistributing comprising waiting until ongoing transactions related to said sessions on said moveable resources are finished and migrating said sessions to said additional resources, and
        remove said removable resources from said assigned portion; wherein said redistributing of sessions is performed in such a way that state information related to said sessions is preserved.

2. The method according to claim 1, wherein the method is applied iteratively.

3. The method according to claim 2, wherein the frequency of said iterative application is varied in function of a difference between said observed relative load and said desired relative load.

4. The method according to claim 1, wherein said selecting removable resources comprises determining an individual load of resources among said assigned portion and selecting resources for which said individual load is lowest.

5. The method according to claim 1, further comprising assigning further additional resources in accordance with a time schedule, said time schedule representing recurring usage patterns for said distributed server infrastructure.

6. The method according to claim 5, wherein said observed relative load is used to update said schedule.

7. A non-transitory computer-usable data carrier storing instructions that, when executed by a processor, cause the processor to carry out a method for dynamically assigning resources of a distributed server infrastructure, the method comprising:
    comparing an observed relative load of an assigned portion of said distributed server infrastructure with a desired relative load;
    if said observed relative load exceeds said desired relative load:
        transmitting instructions to said distributed server infrastructure to assign additional resources, and
        redistribute tasks from said assigned portion to said additional resources, said redistributing comprising waiting until ongoing transactions related to said sessions are finished and migrating said sessions to said additional resources; and if said desired relative load exceeds said desired relative load:

transmitting instructions to said distributed server infrastructure to select removable resources, redistribute tasks from said removable resources to other resources in said assigned portion, said redistributing comprising waiting until ongoing transactions related to said sessions on said moveable resources are finished and migrating said sessions to said additional resources, and remove said removable resources from said assigned portion;

wherein said redistributing of tasks is performed in such a way that state information related to said tasks is preserved.

8. A system for dynamically assigning resources of a distributed server infrastructure, the system comprising:

a monitoring agent configured to observe a relative load of an assigned portion of said distributed server infrastructure;

a processor, operatively connected to said monitoring agent, said processor being configured to compare said observed relative load with a desired relative load; and a management agent, configured to transmit instructions to said distributed server infrastructure, and to act according to rules in response to said comparing, the rules comprising:

if said observed relative load exceeds said desired relative load:

transmit instructions to said distributed server infrastructure to assign additional resources, and redistribute tasks from said assigned portion to said additional resources, said redistributing comprising waiting until ongoing transactions related to said sessions are finished and migrating said sessions to said additional resources; and if said desired relative load exceeds said observed relative load:

transmit instructions to said distributed server infrastructure to select removable resources, redistribute tasks from said removable resources to other resources in said assigned portion, said redistributing comprising waiting until ongoing transactions related to said sessions on said moveable resources are finished and migrating said sessions to said additional resources, and remove said removable resources from said assigned portion.

9. The system according to claim 8, further comprising a scheduler operatively connected to said management agent, wherein said management agent is further configured to act according to the following rules in response to a signal from said scheduler:

if said signal is indicative of an expected increase in demand for resources:

instruct said server infrastructure to assign additional resources, and redistribute tasks from said assigned portion to said additional resources; and if said signal is indicative of an expected decrease in demand for resources:

select removable resources, redistribute tasks from said removable resources to other resources in said assigned portion, and o instruct said server infrastructure to remove said removable resources from said assigned portion.

10. The system according to claim 8, wherein said distributed server infrastructure comprises a plurality of SIP servers.

* * * * *